US012766608B2

(12) United States Patent
Lim et al.

(10) Patent No.: US 12,766,608 B2
(45) Date of Patent: Oct. 20, 2026

(54) CUTTING INSERT

(71) Applicant: NANO TECH Co., Ltd., Chungcheongbuk-do (KR)

(72) Inventors: Sang Ho Lim, Chungcheongbuk-do (KR); Jin Hyeong Kim, Chungcheongbuk-do (KR)

(73) Assignee: NANO TECH Co., Ltd., Chungcheongbuk-do (KR)

( * ) Notice: Subject to any disclaimer, the term of this patent is extended or adjusted under 35 U.S.C. 154(b) by 270 days.

(21) Appl. No.: 18/675,328

(22) Filed: May 28, 2024

(65) Prior Publication Data

US 2025/0187082 A1 Jun. 12, 2025

(30) Foreign Application Priority Data

Dec. 7, 2023 (KR) ........................ 10-2023-0176487

(51) Int. Cl.
*B23B 27/16* (2006.01)
*B23B 27/14* (2006.01)

(52) U.S. Cl.
CPC ......... *B23B 27/1611* (2013.01); *B23B 27/145* (2013.01); *B23B 2200/0471* (2013.01); *B23B 2200/201* (2013.01); *B23B 2200/245* (2013.01)

(58) Field of Classification Search
CPC ............... B23B 27/145; B23B 27/1611; B23B 2200/0471; B23B 2200/201; B23B 2200/245
See application file for complete search history.

(56) References Cited

U.S. PATENT DOCUMENTS

| | | | | |
|---|---|---|---|---|
| 5,584,616 A * | 12/1996 | Katbi | .................... B23B 27/143 407/2 |
| 2019/0039146 A1* | 2/2019 | Bar Hen | ............... B23B 27/145 |
| 2024/0227029 A1* | 7/2024 | Maeno | ................ B23B 27/1611 |

FOREIGN PATENT DOCUMENTS

| | | | |
|---|---|---|---|
| JP | 2007-260848 A | 10/2007 | |
| KR | 10-2013-0122745 A | 11/2013 | |
| KR | 10-2017-0036475 A | 4/2017 | |
| WO | WO 94/22622 A1 | 10/1994 | |
| WO | WO-2016043029 A1 * | 3/2016 | ........... B23B 27/141 |

OTHER PUBLICATIONS

Office action issued on Jul. 28, 2025 from Korean Patent Office in a counterpart Korean Patent Application No. 10-2023-0176487 (English translation is also submitted herewith.).

* cited by examiner

*Primary Examiner* — Jermie E Cozart
(74) *Attorney, Agent, or Firm* — The PL Law Group, PLLC

(57) ABSTRACT

A cutting insert includes a first side cutting edge formed at an edge portion where a first side surface, which is one of the side surfaces, meets an upper surface or a lower surface; a second side cutting edge formed at an edge portion where a second side surface, which is one of the side surfaces, meets the upper surface or the lower surface; and a corner cutting edge located between the first and second side cutting edges and having one end continuous with the first side cutting edge and the other end continuous with the second side cutting edge, the corner cutting edge having a part whose height is constant and a part whose height changes continuously relative to a horizontal plane together.

6 Claims, 9 Drawing Sheets

CUTTING INSERT

BACKGROUND OF THE INVENTION

1. Technical Field

The present disclosure relates to a cutting insert that may be applied to general turning operations as well as drilling operations, and more specifically, to a cutting insert that may further improve the efficiency of cutting operations as well as chip treatment by dually configuring the height of a side cutting edge and a corner cutting edge and improving the geometric structure for a chip breaker.

2. Background Art

The cutting insert is coupled with a machine tool or a cutting tool mounted on the machine tool and is used to cut a workpiece, which is a target for processing, so that the workpiece may be processed into a designed shape. Various types and forms of cutting inserts are disclosed in the art according determine the material, processing continuity, processing method (cutting pressure, feed speed, etc.), shape characteristics, etc.

The cutting insert is equipped with a cutting edge at the ridge portion (edge portion) where the top surface and the side surface intersect, and is mainly formed in a symmetrical polyhedral shape to increase effective usability.

The cutting insert may be classified into a double-sided insert with cutting edges (blade tip) on both the top and bottom surfaces, and a one-sided insert with a cutting edge on any one of the top and bottom surfaces. The cutting edge is usually formed on the edge portion of the cutting insert. Thus, if the cutting insert has a hexahedral shape as an example, the double-sided cutting insert has 8 side cutting edges, and the one-sided cutting insert has 4 side cutting edges.

In addition, the cutting insert may include a corner cutting edge that is continuous with the side cutting edge and has a predetermined radius of curvature (R) formed at the corner of the cutting insert. The corner cutting edge is generally configured so that the entire corner cutting edge area has the same height.

However, if the height of the corner cutting edge is constant as in the past, strength and durability may be improved to some extent, but the cutting load increases relatively significantly, which may cause wear of the cutting insert.

Meanwhile, in the case of a cutting insert in which the height of the corner cutting edge is gradually lowered from the vertex, the corner cutting edge is relatively sharp, so the cutting load may be reduced, but the strength or rigidity is reduced. Thus, if cutting conditions (especially, depth of cut, feed speed, etc.) is improved, the chipping phenomenon, where the cutting edge (corner cutting edge) is damaged or missing, may increase.

Meanwhile, when cutting processing is performed using the cutting insert, the cutting material (chip) is separated from the workpiece and discharged.

If the chips separated from the workpiece are not segmented into appropriately small sizes or are ejected in an elongated form without forming curls, they may act as a cutting load and reduce the efficiency of cutting processing.

In addition, in this case, not only poor surface roughness due to physical contact with the workpiece, but also sticky burning and chipping of the insert may occur, and interference with other components, such as winding around machine tools or equipment, may occur. Thus, problems such as disruption of process continuity may occur.

In order to solve this problem, a chip breaker having a groove shape and used to segment the chips by appropriately controlling the size and shape of the chips generated during cutting is generally provided between the outer peripheral surface and the upper surface of the cutting insert equipped with a cutting edge.

However, when the cutting conditions (speed, feed, depth of cut, etc.) are large or the workpiece is made of a material with low malleability, the conventional chip breaker may properly induce chip control. However, if the cutting conditions are low or the workpiece material is made of a material with high malleability such as SUS, there is a problem that the efficiency of chip control is reduced.

SUMMARY

The present disclosure is designed to solve the problems of the related art, and therefore the present disclosure is directed to providing a cutting insert, which may simultaneously optimizing the strength improvement and the cutting load reduction of the corner cutting edge through structural improvements that diversify the height of the corner cutting edge, and further improve the efficiency of chip control, especially in cutting a workpiece with a small depth of cut, by improving the shape and structure of the chip breaker to form an organic relationship with the structure of the cutting edge.

Other technical goals and advantages of the present invention can be understood with reference to the description below, which will be made explicit by the accompanied examples. Furthermore, the technical goals and advantages of the present invention can be accomplished by the embodiments and their combinations recited in the attached claims.

According to accomplish the above object, a cutting insert according to an embodiment of the present disclosure, which has a polygonal shape and is configured so that adjacent side surfaces form a rounded corner portion, may include: a first side cutting edge formed at an edge portion where a first side surface, which is one of the side surfaces, meets an upper surface or a lower surface; a second side cutting edge formed at an edge portion where a second side surface, which is one of the side surfaces, meets the upper surface or the lower surface; and a corner cutting edge located between the first and second side cutting edges and having one end continuous with the first side cutting edge and the other end continuous with the second side cutting edge, the corner cutting edge having a part whose height is constant and a part whose height changes continuously relative to a horizontal plane together.

Preferably, the corner cutting edge according to the present disclosure may include: a middle part with the same height; a first inclined part having one end connected to one end of the middle part and the other end connected to the first side cutting edge, the first inclined part having a shape whose height decreases as being closer to the first side cutting edge; and a second inclined part having one end connected to the other end of the middle part and the other end connected to the second side cutting edge, the second inclined part having a shape whose height decreases as being closer to the second side cutting edge.

Also, the first and second inclined parts of the present disclosure may have a shape symmetrical to each other with respect to the middle part.

Specifically, the first side cutting edge of the present disclosure may include a first inclined line that is continuous with the first inclined part of the corner cutting edge and has a shape whose height decreases, and in this case, the first inclined line may have a length greater than or equal to the first inclined part.

Also, the second side cutting edge of the present disclosure may include a second inclined line that is continuous with the second inclined part of the corner cutting edge and has a shape whose height decreases, and in this case, the second inclined line may have a length greater than or equal to the second inclined part More preferably, the cutting insert of the present disclosure may further include a chip breaker including first and second ridges formed on the upper surface to branch and extend in a "V" shape and having a shape whose height increases toward the inside and a protrusion formed at an intersection of the first and second ridges.

In this case, the first and second side cutting edges of the present disclosure may have a concave shape whose height decreases in an outer direction from the corner portion and then increases again, and the height of the protrusion may be lower than the height of a top end of the corner cutting edge and higher than the height of a bottom end of the first and second side cutting edges.

Also, the first and second ridges of the present disclosure may extend from the protrusion toward the first and second side cutting edges, respectively, and preferably extend in a direction between a start point of the first and second side cutting edges and a lowest point of the first and second side cutting edges, respectively.

According to a preferred embodiment of the present disclosure, by diversifying the height of the corner cutting edge, the cutting load may be effectively distributed and reduced, and the strength of the cutting edge may be increased, thereby effectively suppressing chipping or breakage.

According to the present disclosure, not only the durability of the cutting insert itself may be improved, but also physical damage such as wear, breakage, chipping, and cracks may be minimized, thereby more effectively increasing the lifespan of the cutting insert.

According to another embodiment of the present disclosure, the chips separated from the workpiece may be induced to be ejected through the guiding of the structure formed organically by the cutting edge and the chip breaker, thereby further improving chip treatment such as chip segmentation or chip curl formation.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
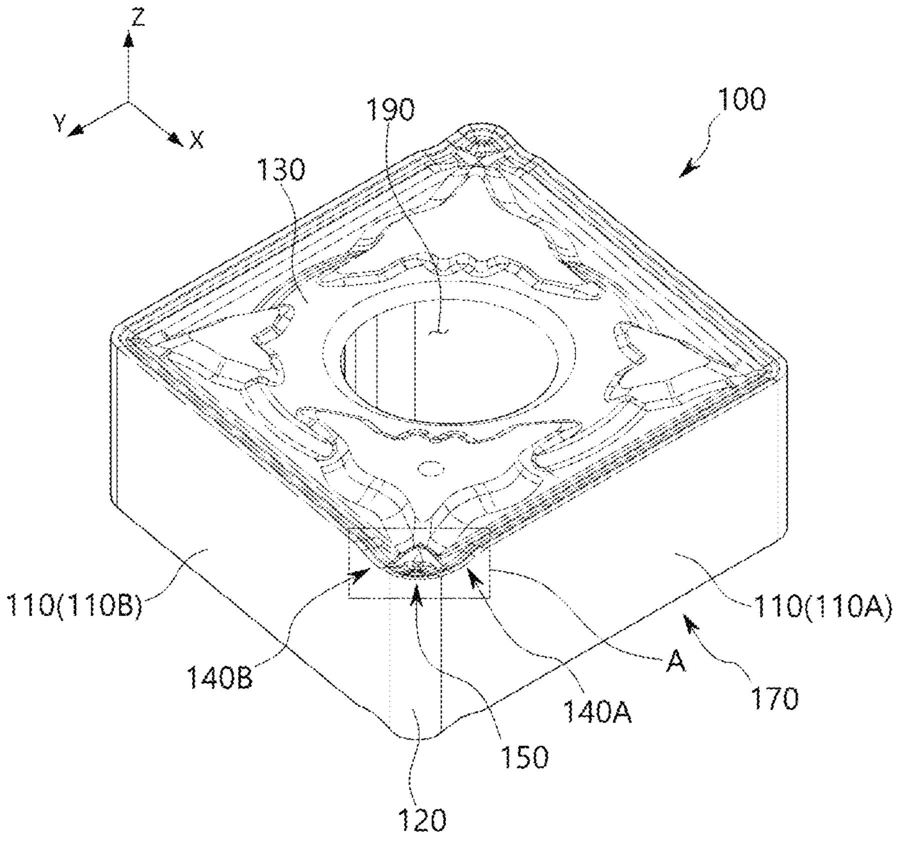
FIG. 1 is a perspective view showing the overall appearance of a cutting insert according to an embodiment of the present disclosure.
Figure 2:
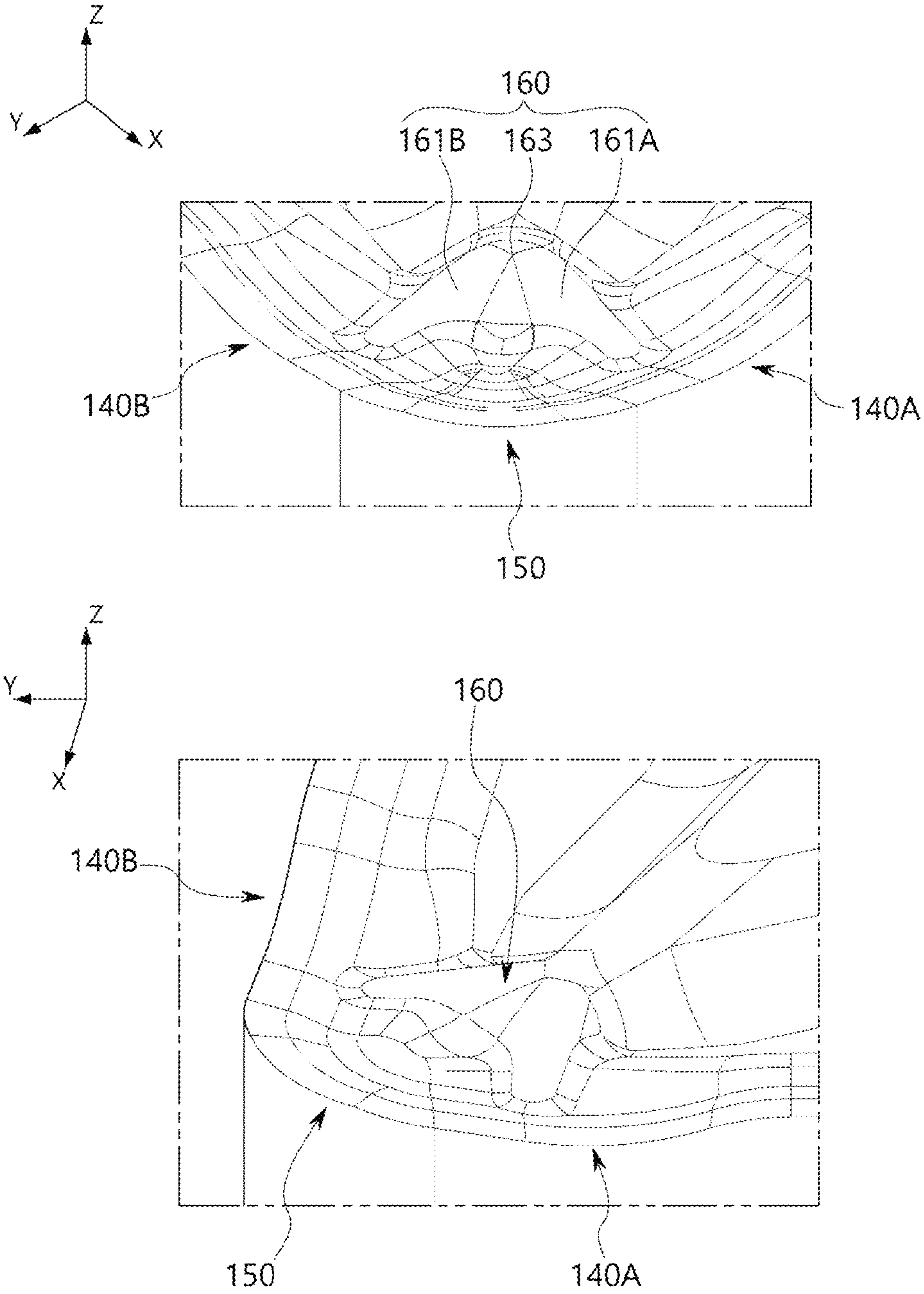
FIG. 2 is an enlarged perspective view showing the detailed configuration of portion "A" in FIG. 1.

FIG. 1 is a perspective view showing the overall appearance of a cutting insert according to an embodiment of the present disclosure, and FIG. 2 is an enlarged perspective view showing the detailed configuration of portion "A" in FIG. 1.

As shown in FIG. 1, the cutting insert 100 according to the present disclosure has a polyhedral shape, and a fastening hole 190 into which a cutting machine or cutting tool is fastened is formed in the center of the cutting insert 100.

The drawings show an embodiment in which the cutting insert 100 has a hexahedral shape with a square cross-section (diamond or parallelogram, etc.) based on the horizontal plane (XY plane). However, depending on the embodiment, the cutting insert 100 of the present disclosure may also be implemented in a polyhedral shape with a polygonal cross-section, different from the above.

The axes shown in the drawings, terms referring to the axes, and terms such as top, bottom, front, rear, vertical, horizontal, etc. described with respect to the axes are intended to present relative standards for describing embodiments of the present disclosure, and it is obvious that they are not intended to specify any direction or location on an absolute basis, and of course, they may vary relatively depending on the location of a target object, the location of an observer, the view direction, etc.

Hereinafter, in the present disclosure below, the Z axis is defined as a direction axis corresponding to the height of the cutting insert 100, and the plane formed by the X and Y axes perpendicular to the Z axis or a plane parallel thereto is defined as a horizontal plane.

In addition, FIG. 1 shows a double-sided cutting insert 100 with cutting edges provided on both the top and bottom portions, but this is just an example, and the cutting insert 100 according to the present disclosure may also be implemented as a one-sided cutting insert with a cutting edge provided on any one of the top and bottom portions.

Based on the embodiment illustrated in FIG. 1, the cutting insert 100 of the present disclosure includes an upper surface 130, a lower surface 170, a side surface 110 connecting the upper surface 130 and the lower surface 170, and a fastening hole 190 penetrating the upper surface 130 and the lower surface 170 as a whole.

In addition, the cutting insert 100 of the present disclosure may include a corner portion 120 that is formed at a corner where adjacent side surfaces 110A, 110B meet and has a round shape extending in the vertical (Z-axis direction) longitudinal direction. A corner cutting edge 150, which is one of the essential components of the present disclosure, is provided at the upper or/and lower part of the corner portion 120.

The first side cutting edge 140A of the present disclosure is formed at a corner (ridge portion) where the first side surface 110A, which is one of the side surfaces of the cutting insert 100, meets the upper surface 130 or/and the lower surface 170, and is continuous with the corner cutting edge 150 in the right direction (−Y-axis direction) based on the corner cutting edge 150.

The second side cutting edge 140B, which is symmetrical in position with the first side cutting edge 140A, is located at a corner (ridge portion) where the second side surface 110B, which is one of the side surfaces of cutting insert 100, meets the upper surface 130 or/and the lower surface 170.

The second side cutting edge 140B is configured to be continuous with the corner cutting edge 150 like the first side cutting edge 140A. Based on the embodiment shown in FIG. 1, the second side cutting edge 140B is continuous in the left direction (−X-axis direction) based on the corner cutting edge 150.

The corner cutting edge 150 of the present disclosure is located between the first side cutting edge 140A and the second side cutting edge 140B, and has one end (at the right side in the drawing) continuous with the first side cutting edge 140A and the other end (at the left side in the drawing) continuous with second side cutting edge 140B.

As shown in the drawings, a chip breaker 160 of the present disclosure is provided inside the corner cutting edge 150, the first side cutting edge 140A, and the second side cutting edge 140B to effectively control chip processing. The chip breaker 160 will be described in detail later.

Figure 3:
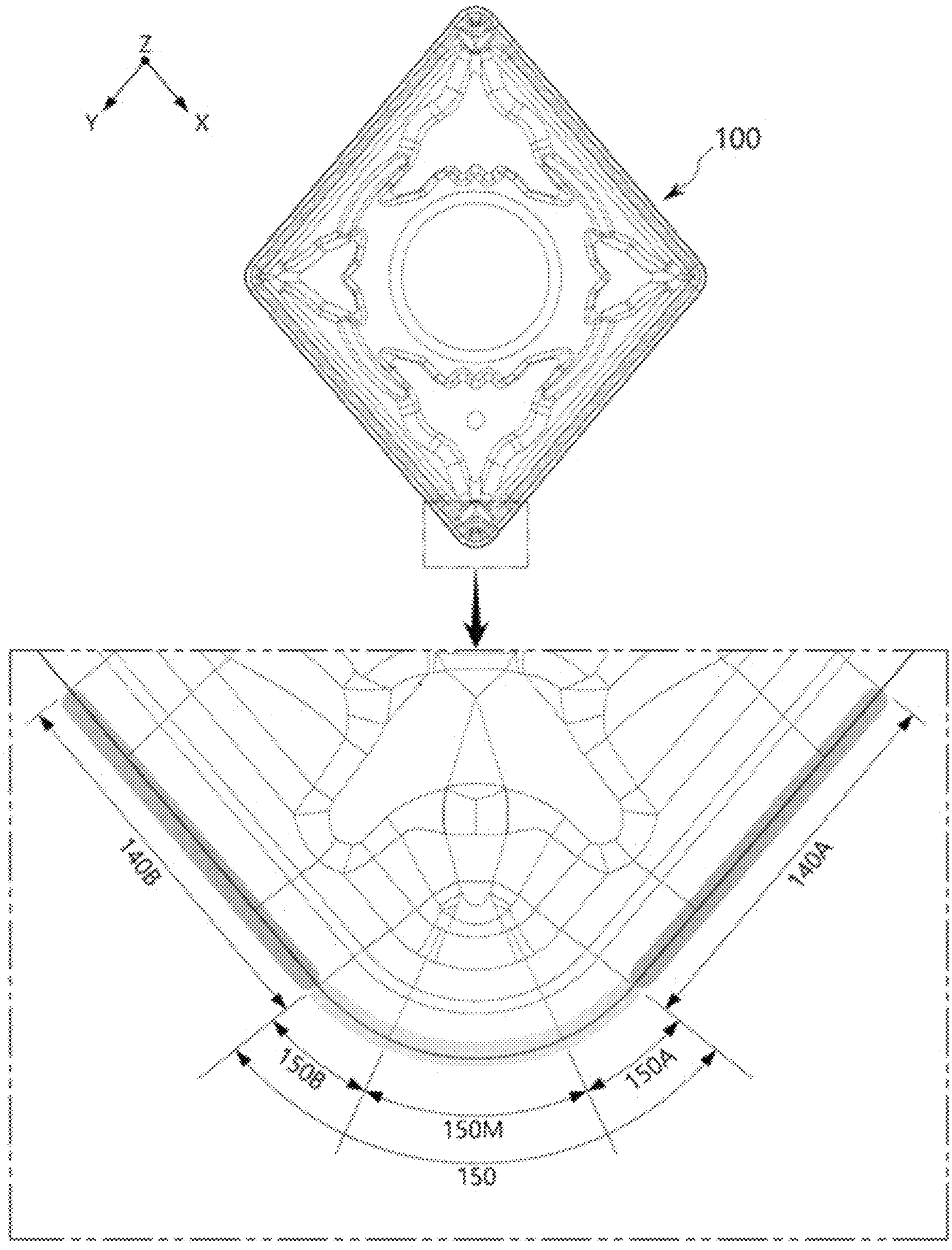
FIG. 3 is a diagram showing the detailed configuration of a corner cutting edge according to an embodiment of the present disclosure.
Figure 4:
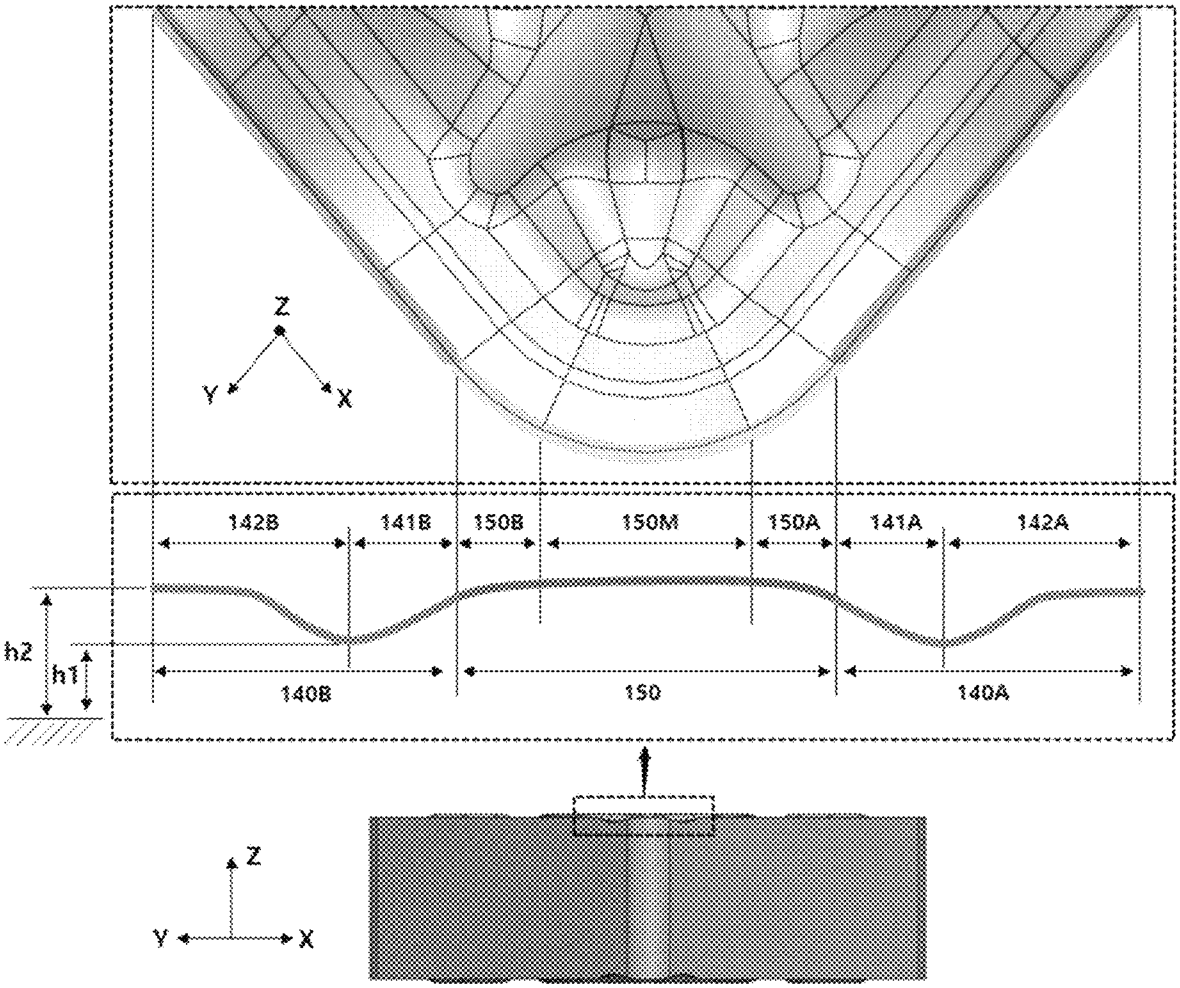
FIG. 4 is a diagram showing the relationship between the corner cutting edge and the side cutting edge according to an embodiment of the present disclosure.
Figure 5:
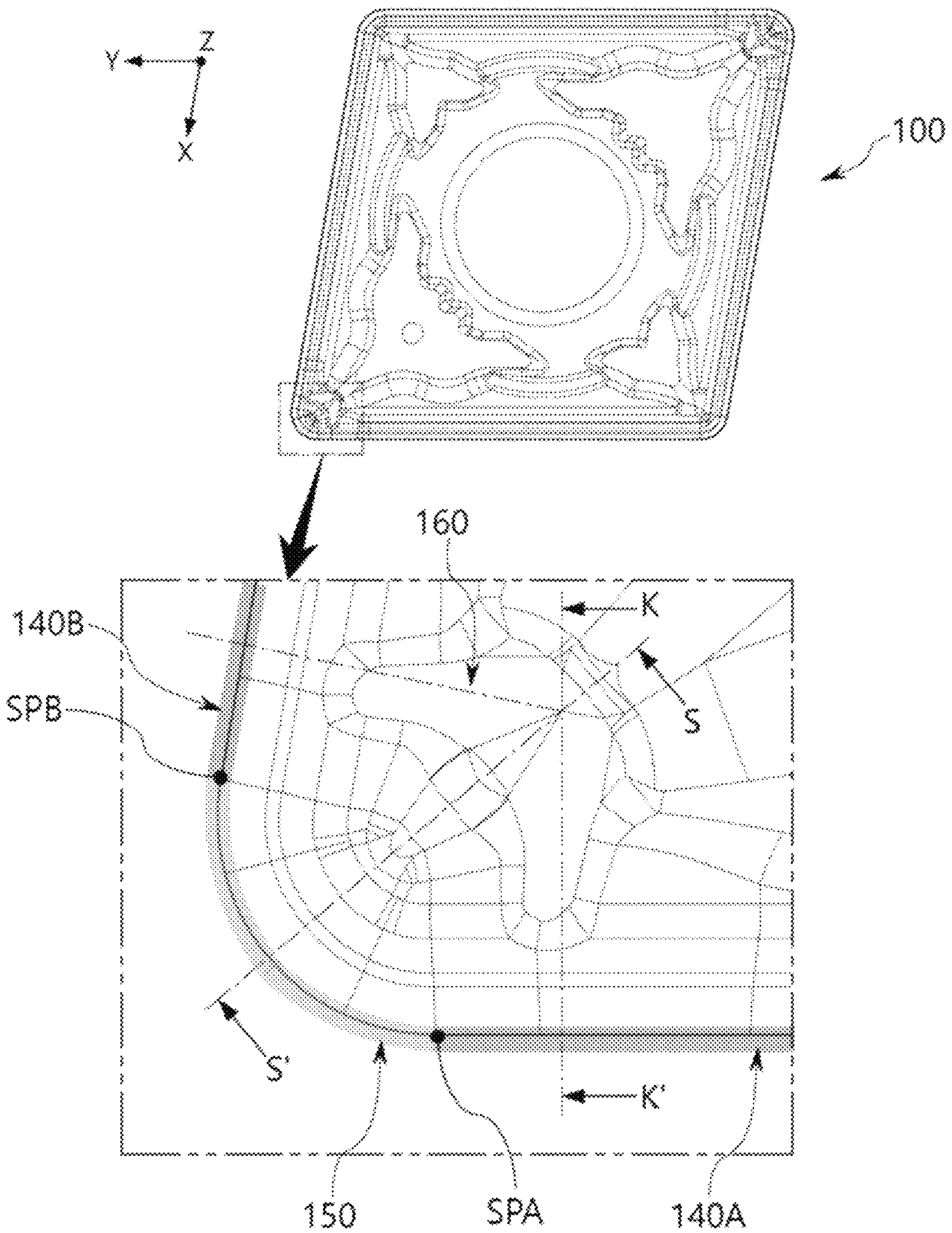
FIG. 5 is a drawing showing the detailed configuration of an upper corner of the cutting insert.

FIG. 3 is a diagram showing the detailed configuration of a corner cutting edge 150 and the like according to an embodiment of the present disclosure, FIG. 4 is a diagram showing the relationship between the corner cutting edge 150 and the side cutting edge 140A, 140B according to an embodiment of the present disclosure, and FIG. 5 is a drawing showing the detailed configuration of an upper corner of the cutting insert 100.

As shown in the drawings, the corner cutting edge 150 of the present disclosure is configured to have a part whose height is constant and a part whose height changes continuously relative to a horizontal plane together.

Specifically, the corner cutting edge 150 of the present disclosure may be configured to include a middle part 150M, a first inclined part 150A, and a second inclined part 150B.

The middle part 150M is located at the center portion of the corner cutting edge 150 and is configured to have the same height ("h2", see FIG. 4) relative to the horizontal plane.

The first inclined part 150A, which is one component of the corner cutting edge 150, has one end connected to one end of the middle part 150M and the other end connected to the first side cutting edge 140A, and is configured to have a shape whose height decreases as being closer to the first side cutting edge 140A.

The second inclined part 150B is configured to be symmetrical in location, shape, and structure with the first inclined part 150A based on the middle part 150M. One end of the second inclined part 150B is connected to the other end of the middle part 150M, and the other end is connected to the second side cutting edge 140B. Also, like the first inclined part 150A, the second inclined part 150B is configured to have a shape whose height decreases as being closer to the second side cutting edge 140B. It is constructed to have a shape.

Since the corner cutting edge 150 of the present disclosure includes a part whose height is constant and a part whose height gradually decreases to be symmetrical to each other together as above, it is possible to maintain a certain level of durability or rigidity. Moreover, since the cutting edge for cutting processing has sharpness, the function of reducing cutting load may also be implemented simultaneously.

As shown in FIG. 4, the first side cutting edge 140A of the present disclosure includes a first inclined line 141A continuous with the first inclined part 150A of the corner cutting edge 150 and having a shape whose height decreases, and a third inclined line 142A continuous with the first inclined line 141A and having a shape whose height gradually increases.

The part indicated as "SPA" in FIG. 5 is a point where the first side cutting edge 140A begins, namely a portion where the first side cutting edge 140A is connected to the corner cutting edge 150, specifically the first inclined part 150A of the corner cutting edge 150, and the part indicated as "SPB" becomes a point where the second side cutting edge 140B starts.

The first side cutting edge 140A of the present disclosure has a concave shape in which the height is lowered based on the direction facing outward (−Y-axis direction) from the corner portion 120 or the corner cutting edge 150 and then increases again as a whole by the first inclined line 141A and the third inclined line 142A. The slope of the height may be formed not only linearly, but also in a curved shape.

Due to this shape structure, the point with the lowest height at the first side cutting edge 140A, namely the border point (BPA, see FIG. 8) of the first inclined line 141A and the third inclined line 142A, has a height difference (h2−h1) from the highest point of the corner cutting edge 150.

In addition, the first inclined line 141A of the first side cutting edge 140A, which has a shape whose height decreases as shown in FIG. 4, etc., is preferably configured to have a length greater than or equal to the first inclined part 150A of the corner cutting edge 150.

In a corresponding point of view, the second side cutting edge 140B of the present disclosure includes a second inclined line 141B continuous with the second inclined part 150B of the corner cutting edge 150 and having a shape whose height decreases, and a fourth inclined line 142B continuous with the second inclined line 141B and having a shape whose height gradually increases.

The second inclined line 141B of the second side cutting edge 140B is also preferably configured to have a length greater than or equal to the second inclined part 150B of the corner cutting edge 150.

In this configuration, the sharpness of the corner cutting edge 150 may be sufficiently extended toward the edge of the side surface through the side cutting edges 140A, 140B that are continuous with the corner cutting edge 150, thereby implementing the load reduction on cutting processing more effectively. Moreover, as will be described later, the discharge direction and discharge movement line of chips, which are substances separated from the workpiece through cutting, etc., may be more effectively guided.

Figure 6:
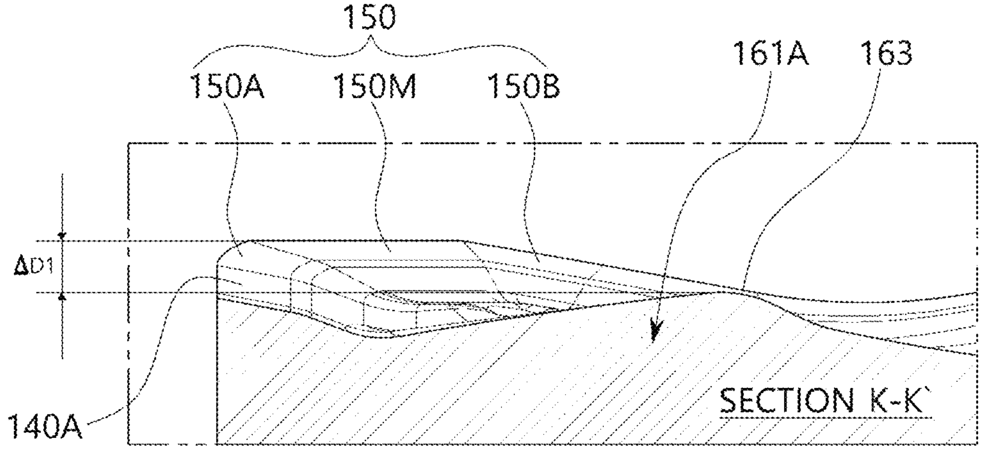
FIG. 6 is a cross-sectional view and partial perspective view taken along line K-K' of FIG. 5.
Figure 6:
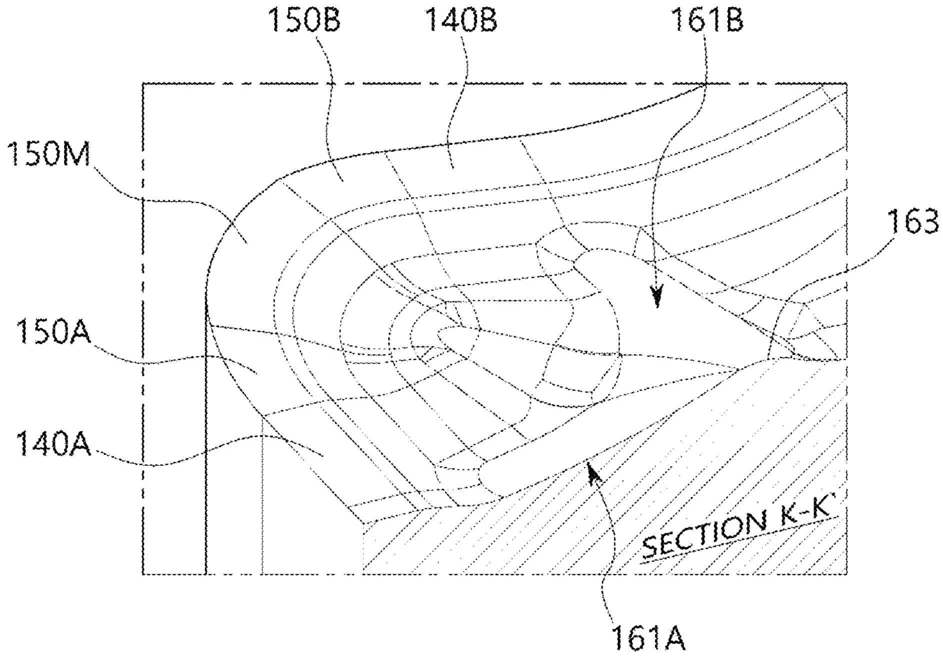
Figure 7:
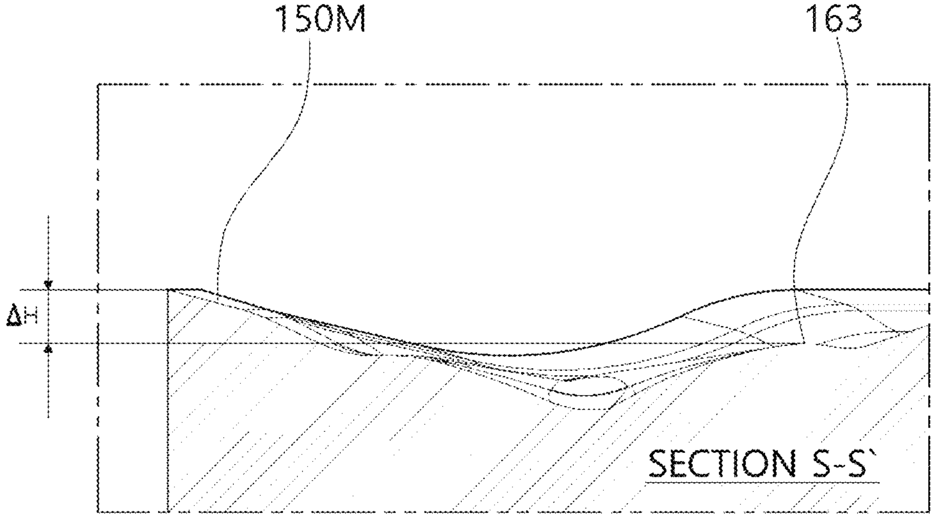
FIG. 7 is a cross-sectional view and partial perspective view taken along S-S' in FIG. 5.
Figure 7:
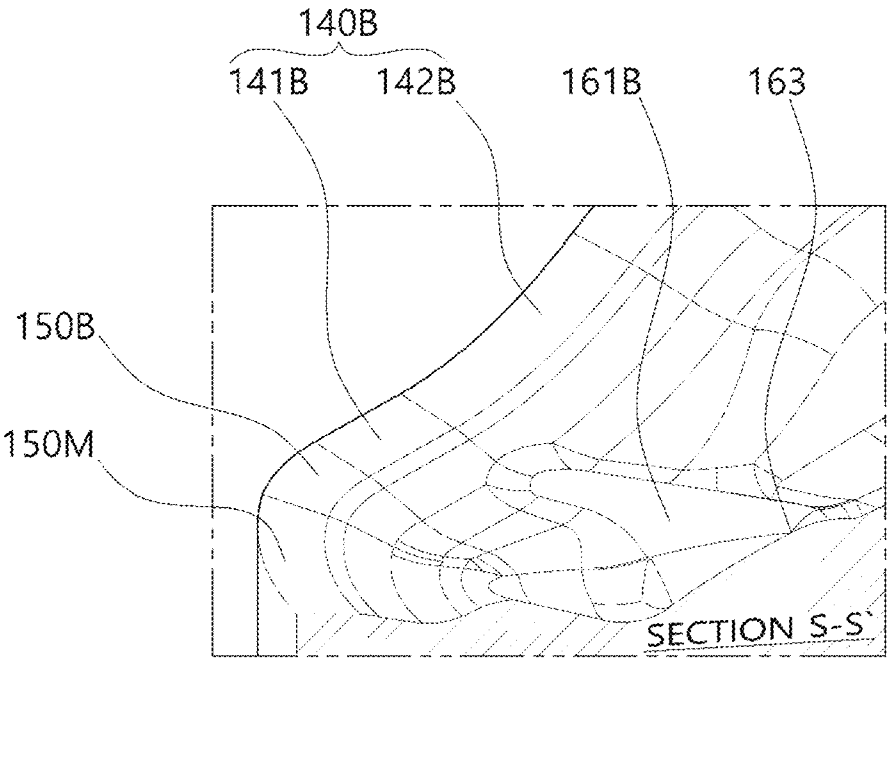
Figure 8:
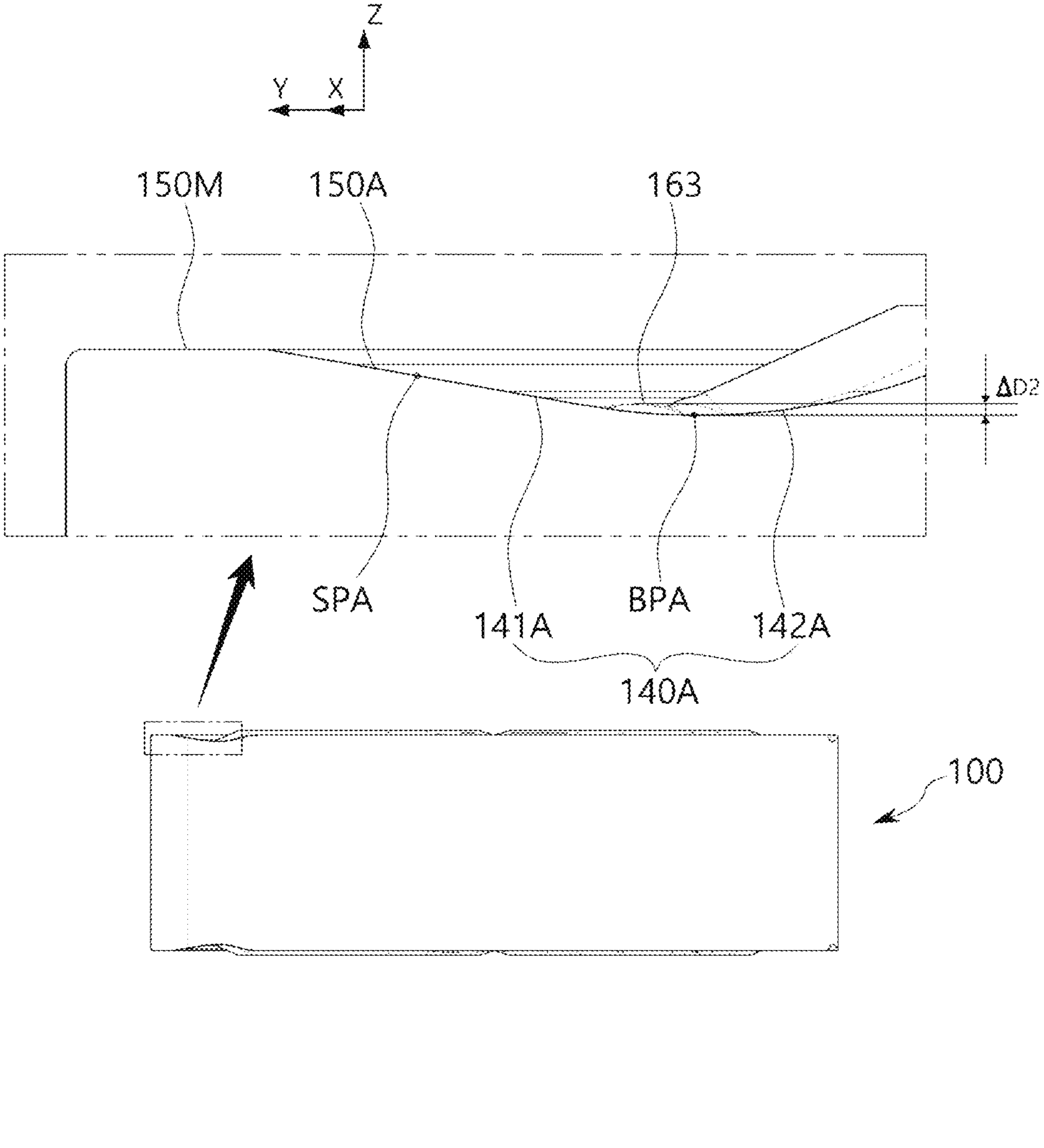
FIG. 8 is a drawing for illustrating the structural relationship between the cutting edge and the chip breaker.

FIG. 6 is a cross-sectional view and partial perspective view taken along line K-K' of FIG. 5, FIG. 7 is a cross-sectional view and partial perspective view taken along S-S' in FIG. 5, and FIG. 8 is a drawing for illustrating the structural relationship between the cutting edge 140, 150 and the chip breaker 160. Hereinafter, the detailed configuration of the chip breaker 160 according to a preferred embodiment of the present disclosure will be described with reference to the attached drawings.

The chip breaker 160 of the present disclosure corresponds to a configuration that effectively induces the discharge of chips (C, see FIGS. 9A and 9B), which are substances separated from the workpiece, and inducing the discharged chips C not to be discharged in an elongated shape in the longitudinal direction, but to form a curl shape.

As shown in FIG. 2, etc., the chip breaker 160 of the present disclosure is formed inside the upper surface 130 based on the corner portion 120 and may be specifically configured to include a first ridge 161A, a second ridge 161B, and a protrusion 163.

The first and second ridges 161A, 161B, which are formed on the upper surface 130 of the cutting insert 100 and branch and extend in a "V" shape, have a continuous raised shape, so that their height gradually increases inwards. Therefore, a predetermined concave portion is formed between the first ridge 161A and the second ridge 161B.

The first ridge 161A and the second ridge 161B are configured to intersect inside the upper surface 130, and the intersection point becomes the protrusion 163, which forms the top end of the chip breaker 160.

The protrusion 163, which is a component of the chip breaker 160, is preferably configured to have a height lower ($\Delta$D1) than the height of the top end of corner cutting edge 150, namely the height of the middle part 150M of the corner cutting edge 150 as shown in FIGS. 6 and 7, and higher ($\Delta$D2) than the height of the bottom ends of the first and second side cutting edges 140A, 140B as shown in FIG. 8.

In addition, the first ridge 161A of the present disclosure extends the from protrusion 163 toward the first side cutting edge 140A, and is preferably configured to extend in a direction between the start point SPA of the first side cutting edge 140A and the lowest point BPA of the first side cutting edge 140A. The second ridge 161B, which is provided at a position symmetrical to the first ridge 161A, is also configured as above.

According to the embodiment of the present disclosure, since the chips (C, see FIGS. 9A and 9B) discharged from the workpiece through the first inclined part 150A, which is a region where the height decreases in the corner cutting edge 150, and the first inclined line 141A of the first side cutting edge 140A, which is continuous with the first inclined part 150A and has a continuously lowering slope, are naturally guided to the chip breaker 160 of the present disclosure, the initially formed chips C may be effectively guided into a curl shape.

Figure 9A:
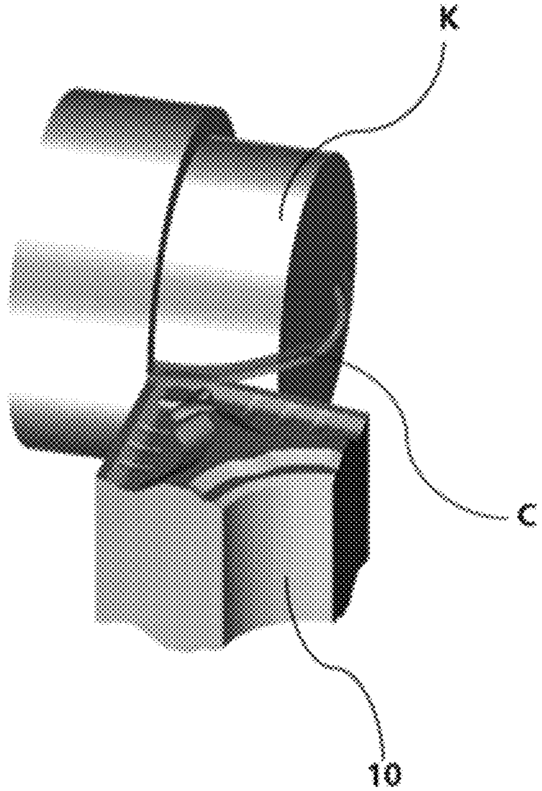
FIGS. 9A and 9B are diagrams showing chips ejected while forming curls by the cutting insert of the present disclosure.
Figure 9B:
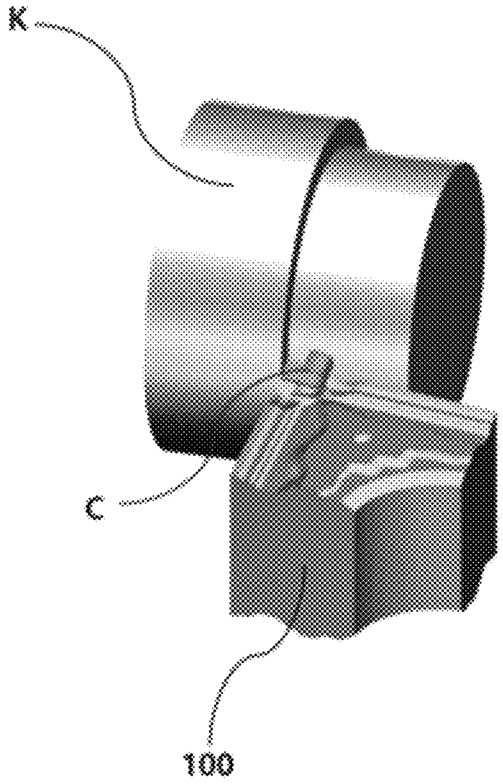

FIG. 9A is a diagram showing chips C discharged from the workpiece K in a form elongated in the longitudinal direction by the conventional cutting insert 10, and FIG. 9B is a drawing showing the form of chips C discharged in a curl shape by the cutting insert 100 according to the present disclosure.

In particular, when the depth of cut is small (for example, when the depth of cut is less than or equal to the corner radius (R)), chip curl may be formed more effectively through the structural shape of the chip breaker 160 descending inwards at the outer side of the cutting edges 150, 140A, 140B and the interaction of the cutting edges 150, 140A having a shape whose height decreases.

Furthermore, the chips discharged from the workpiece has a directional component that rises at the rear based on the discharge direction and naturally physically collides with the protrusion 163 of the present disclosure, so the chip curl may be induced to form more expansively or the shear (segmentation) of the chips C may be induced more effectively.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

In the above description of this specification, the terms such as "first" and "second" etc. are merely conceptual terms used to relatively identify components from each other, and thus they should not be interpreted as terms used to denote a particular order, priority or the like.

The drawings for illustrating the present disclosure and its embodiments may be shown in somewhat exaggerated form in order to emphasize or highlight the technical contents of the present disclosure, but it should be understood that various modifications may be made by those skilled in the art in consideration of the above description and the illustrations of the drawings without departing from the scope of the present invention.

What is claimed is:

1. A cutting insert, which has a polygonal shape and is configured so that adjacent side surfaces form a rounded corner portion, the cutting insert comprising:

a first side cutting edge formed at an edge portion where a first side surface, which is one of the side surfaces, meets an upper surface or a lower surface;

a second side cutting edge formed at an edge portion where a second side surface, which is one of the side surfaces, meets the upper surface or the lower surface;

a corner cutting edge located between the first and second side cutting edges and having one end continuous with the first side cutting edge and the other end continuous with the second side cutting edge, the corner cutting edge having a part whose height is constant and a part whose height changes continuously; and a chip breaker including first and second ridges formed on the upper surface to branch and extend in a "V" shape and having a shape whose height increases inwards and a protrusion formed at an intersection of the first and second ridges, wherein the first and second side cutting edges have a concave shape whose height decreases in an outer direction from the corner portion and then increases again, and wherein the height of the protrusion is lower than the height of a top end of the corner cutting edge and higher than the height of a bottom end of the first and second side cutting edges.

2. The cutting insert according to claim 1, wherein the corner cutting edge includes:

a middle part with a same height;

a first inclined part having one end connected to one end of the middle part and the other end connected to the first side cutting edge, the first inclined part having a shape whose height decreases as being closer to the first side cutting edge; and a second inclined part having one end connected to the other end of the middle part and the other end connected to the second side cutting edge, the second inclined part having a shape whose height decreases as being closer to the second side cutting edge.

3. The cutting insert according to claim 2, wherein the first and second inclined parts have a shape symmetrical to each other with respect to the middle part.

4. The cutting insert according to claim 2, wherein the first side cutting edge includes a first inclined line that is continuous with the first inclined part of the corner cutting edge and has a shape whose height decreases, and wherein the first inclined line has a length greater than or equal to the first inclined part.

5. The cutting insert according to claim 2, wherein the second side cutting edge includes a second inclined line that is continuous with the second inclined part of the corner cutting edge and has a shape whose height decreases, and wherein the second inclined line has a length greater than or equal to the second inclined part.

6. The cutting insert according to claim 1, wherein the first and second ridges extend from the protrusion toward the first and second side cutting edges, respectively, and extend in a direction between a start point of the first and second side cutting edges and a lowest point of the first and second side cutting edges, respectively.

* * * * *